(12) United States Patent
Hwu et al.

(10) Patent No.: US 9,884,306 B2
(45) Date of Patent: Feb. 6, 2018

(54) CONVECTION-FREE FLOW-TYPE REACTOR AND FLOW-TYPE SYNTHESIS METHOD

(71) Applicant: ACADEMIA SINICA, Taipei (TW)

(72) Inventors: Yeu-Kuang Hwu, Taipei (TW); Sheng-Feng Lai, Taipei (TW); Cheng-Liang Wang, Taipei (TW)

(73) Assignee: ACADEMIA SINICA, Taipei (TW)

( * ) Notice: Subject to any disclaimer, the term of this patent is extended or adjusted under 35 U.S.C. 154(b) by 108 days.

(21) Appl. No.: 14/324,180

(22) Filed: Jul. 5, 2014

(65) Prior Publication Data

US 2015/0008117 A1   Jan. 8, 2015

(30) Foreign Application Priority Data

Jul. 4, 2013   (TW) .............................. 102123934 A

(51) Int. Cl.
| | |
|---|---|
| *B01J 19/12* | (2006.01) |
| *B01J 19/00* | (2006.01) |
| *B01J 19/02* | (2006.01) |
| *B01J 19/08* | (2006.01) |
| *B01J 19/24* | (2006.01) |
| *B01J 4/00* | (2006.01) |

(52) U.S. Cl.
CPC ............ *B01J 19/125* (2013.01); *B01J 4/002* (2013.01); *B01J 19/0093* (2013.01); *B01J 19/02* (2013.01); *B01J 19/082* (2013.01); *B01J 19/2415* (2013.01); *B01J 2219/00164* (2013.01); *B01J 2219/00799* (2013.01); *B01J 2219/00801* (2013.01); *B01J 2219/00822* (2013.01); *B01J 2219/00833* (2013.01); *B01J 2219/00927* (2013.01); *B01J 2219/00939* (2013.01); *B01J 2219/00959* (2013.01); *B01J 2219/0277* (2013.01); *B01J 2219/0295* (2013.01); *B01J 2219/0871* (2013.01); *B01J 2219/0877* (2013.01)

(58) Field of Classification Search
None
See application file for complete search history.

(56) References Cited

U.S. PATENT DOCUMENTS

| | | | | |
|---|---|---|---|---|
| 6,118,852 | A * | 9/2000 | Rogers ...................... | H01J 5/22 378/140 |
| 6,563,110 | B1 * | 5/2003 | Leri .......................... | H05F 3/06 204/164 |
| 6,764,657 | B2 * | 7/2004 | Korenev ................... | B29B 13/08 422/186 |
| 2014/0061026 | A1 * | 3/2014 | Gerlinger ................. | C08K 5/05 204/157.71 |
| 2015/0005400 | A1 * | 1/2015 | Kalliopuska ............. | C08J 11/16 521/41 |

\* cited by examiner

*Primary Examiner* — Kishor Mayekar
(74) *Attorney, Agent, or Firm* — Pai Patent & Trademark Law Firm; Chao-Chang David Pai

(57) ABSTRACT

A convection-free flow-type reactor includes a reactor body. The reactor body includes a reaction chamber to house a fluid. An inlet is in communication with the reaction chamber to allow input of a reactant fluid. An outlet is in communication with the reaction chamber to allow output of a product fluid. An energy beam source device provides an energy beam to irradiate the reactant fluid in the reaction chamber. The disclosure further provides a convection-free flow-type synthesis method.

10 Claims, 6 Drawing Sheets

CONVECTION-FREE FLOW-TYPE REACTOR AND FLOW-TYPE SYNTHESIS METHOD

CROSS REFERENCE TO RELATED APPLICATIONS

This Application claims priority of Taiwan Patent Application No. 102123934, filed on Jul. 4, 2013, the entirety of which is incorporated by reference herein.

BACKGROUND OF THE INVENTION

Field of the Invention

The invention relates to a flow-type reactor and a flow-type synthesis method using high-energy beam irradiation.

Description of the Related Art

In conventional photochemical reactions, since irradiant energy such as ultraviolet light does not have sufficient transmission or intensity, the required reaction time is long, such as several minutes to several hours or longer. Therefore, the reactions need to be batch reactions. However, in the batch reactions, the product after each reaction needs to be taken out in order to proceed with the next batch reaction, which results in an increase in processing time, manual labor and manufacturing cost. In addition, batch reactions are more expensive and make it difficult to achieve high productivity. Compared with batch reactions, flow-type reactions do not require the step of taking out the product after each reaction. Therefore, flow-type reactions provide economic benefits and higher productivity, and are suitable for mass production. However, as described above, the required reaction time for the conventional photochemical reactions is too long to be implemented by the flow-type reactions. Moreover, uniformity of the conventional photochemical reactions may be poor, and does not facilitate controlling the properties of materials (e.g., particle size).

In this regard, the present disclosure combines a convection-free effect and a high-energy beam with the flow-type reactions to overcome the problems of the prior art, i.e. that the reactions can only occurs as batch reactions and the uniformity of the reactions may be poor.

BRIEF SUMMARY OF THE INVENTION

A detailed description is given in the following embodiments with reference to the accompanying drawings. A convection-free flow-type reactor and convection-free flow-type synthesis methods are provided.

An exemplary embodiment of a convection-free flow-type reactor comprises a reactor body. The reactor body comprises a reaction chamber to house a fluid. An inlet communicates with the reaction chamber to allow input of a reactant fluid. An outlet communicates with the reaction chamber to allow output of a product fluid. An energy beam source device provides an energy beam to irradiate the reactant fluid in the reaction chamber.

An exemplary embodiment of a convection-free flow-type synthesis method comprises providing a convection-free flow-type reactor described above. A reactant fluid is input into the reaction chamber through the inlet. An energy beam irradiates the reactant fluid in the reaction chamber through an energy beam transmissible material to form a product fluid. The product fluid is output through the outlet.

Another exemplary embodiment of a convection-free flow-type synthesis method comprises providing an energy beam and a flowing precursor fluid. The energy beam irradiates the flowing precursor fluid to proceed to a synthesis reaction to form a product fluid.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
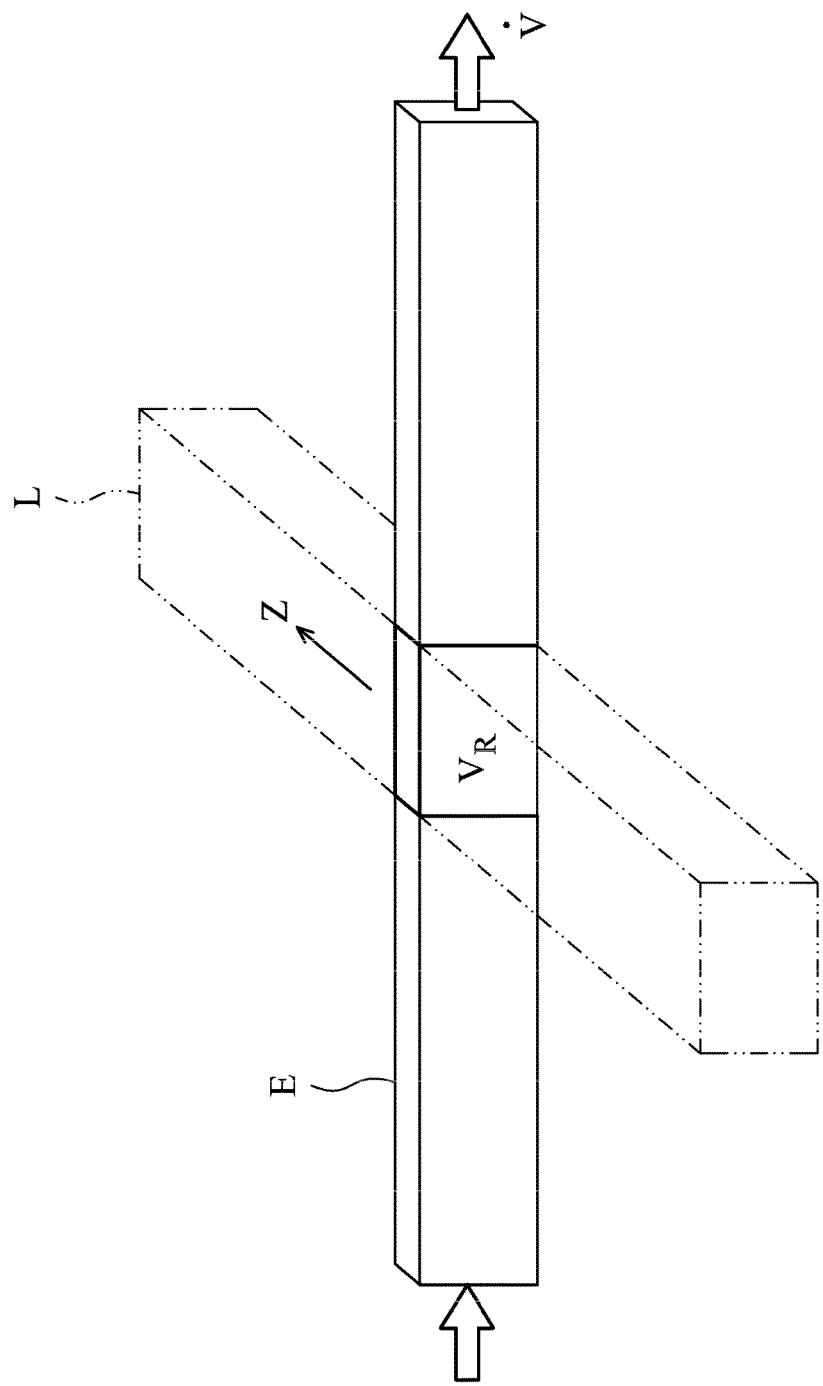
FIG. 1 illustrates an exemplary embodiment of a convection-free flow-type synthesis method according to the invention.

The following description is of a mode for carrying out the invention. This description is made for the purpose of illustrating the general principles of the invention and should not be taken in a limiting sense. The scope of the invention is best determined by reference to the appended claims. Moreover, the same or similar elements in the drawings and the description are labeled with the same reference numbers.

A convection-free flow-type synthesis method according to the present disclosure is provided, as shown in FIG. 1. An energy beam E and a flowing reactant fluid L are provided, and then the flowing reactant fluid L is irradiated by the energy beam E for a synthesis reaction. The flowing reactant fluid L forms a product fluid after the synthesis reaction.

The energy beam E used in the present disclosure may comprise a high energy and high radiant flux (i.e., high radiation dose rate) γ-ray, X-ray or electron beam. In some embodiments, the energy beam may be a synchrotron radiation X-ray. The energy beam E has high transmission and can transmit through a unit volume of the reactant fluid irradiated thereby (the transmission is at least greater than 0%), such that convection-free effect can be achieved. Herein, "convection-free effect" is when an energy beam, such as a high energy X-ray or γ-ray, having sufficient transmission irradiates a unit volume of the reactant fluid, all of the reactant fluid in the unit volume reacts efficiently and uniformly almost at the same time. If the energy beam does not have sufficient transmission, after the reactant fluid is irradiated by the energy beam, some area thereof, such as a downstream (along the X-axis) portion of the volume $V_R$ in the reaction system shown in FIG. 1, does not undergo a reaction. Therefore, the reactant fluid needs to fully undergo the reaction by convection, such as heat convection or reactant diffusion, which results in difference in reaction time. Thus, the uniformity of the reaction is poor, and thus the reactant fluid does not even fully undergo the reaction. The transmission of the reactant fluid mainly concerns the energy value of the energy beam, the thickness of the reactant volume for transmission, and the type of the reactant.

When a medium, such as a reactant fluid, is irradiated by a high-energy photon beam, such as the high energy and high radiant flux X-ray or γ-ray used in the present disclosure, most energy is absorbed by forming secondary electrons, or by other ways. The degree of absorption is mainly determined by the composition of atoms, and is almost irrelevant to molecule structure. Therefore, when a photon beam transmits into a medium, the intensity thereof is attenuated as the transmitting depth is increased, and the intensity of the photon beam transmitting a specific thickness of the medium is defined as follows:

$$I = I_0 \cdot e^{-\mu z}$$

where I represents the intensity of a photon beam after being absorbed, $I_0$ represents the initial incident intensity of the photon beam, μ represents the linear attenuation coefficient of the medium, and z represents the thickness of the medium.

Figure 2:
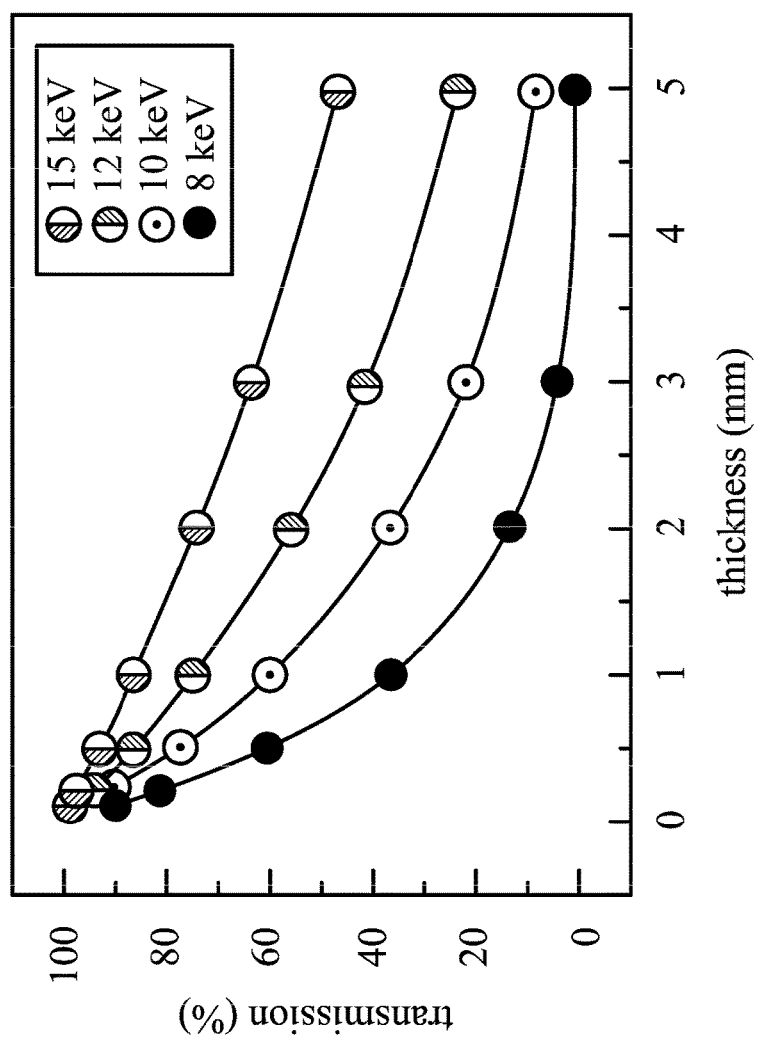
FIG. 2 is a diagram showing the relationship between the thickness of a reactant fluid irradiated by photon beams having different energy and the transmission of the photon beams according to the exemplary embodiment of the convection-free flow-type synthesis method shown in FIG. 1.

FIG. 2 is a diagram showing relationships between thicknesses of a reactant fluid irradiated by photon beams having different energy and transmission of the photon beams according to the exemplary embodiment of the convection-free flow-type synthesis method shown in FIG. 1. Herein, the reactant fluid is liquid water, and the high-energy photon beam is an X-ray. When the transmission is the same, the thickness of the liquid water that the X-ray can transmit, is increased as the energy of the X-ray is increased. In the present disclosure, when the reactant fluid is irradiated by energy beams having different energy, the maximum thickness of the reactant fluid may be determined according to the transmission of the energy beams for transmitting the reactant fluid. Herein, when an area irradiated by the high-energy photon beam is greater than a cross-sectional area of a reacting unit of the reactant fluid, the maximum thickness of the reactant fluid is determined as the transmission of the high-energy photon beam is 5%, while convection effect of Z-axis in the reaction system (as shown in FIG. 1) may almost be omitted. The maximum thickness of the reactant fluid may also be increased as the transmission or the energy of the photon beam is increased.

In addition, when the photon beam irradiates the volume of the reactant fluid, an average time for the overall reactant fluid to be irradiated by the photon beam is determined according to a volumetric flow rate of the reactant fluid. The average time $t_m$ for the overall reactant fluid remaining in the photon beam irradiation reaction system after being irradiated by the photon beam or after reacting, is defined as follows:

$$t_m = \int_0^{V_R} \frac{dV_R}{\dot{V}}$$

where $V_R$ represents a volume of the reaction system and $\dot{V}$ represents a volumetric flow rate. If the photon beam irradiates continuously, the average time $t_m$ is equal to an average time for the overall reactant fluid to be irradiated by the photon beam after being irradiated by the photon beam or after reacting, and concerns the dose rate of the photon beam and the required overall energy for producing a specific quantity of the product. Namely, when the volume of the reactant fluid irradiated by the photon beam and the quantity of a specific product are fixed, the required irradiation time is decreased as the dose rate of the photon beam is increased. If the average irradiation time of the photon beam is insufficient, the reaction has not fully been done, and a convection effect occurs in the Z-axis of the reaction system (as shown in FIG. 1). In order to avoid the convection effect, the average time $t_m$ needs to be greater than 1/10 second.

When the energy beam irradiates a flowing reactant fluid, the irradiation distance is not particularly limited and may be adjusted according to demand. Moreover, the energy beam may irradiate the reactant fluid continuously or intermittently according to demand. In some embodiments where the high energy and high flux X-ray is used, the dose rate of the X-ray may be greater than $10^{12}$ photons·(mm²·s)⁻¹, or the dose rate may be greater than 3 mJ·(cm²·s)⁻¹. Compared with energy sources commonly used for the photochemical reactions, such as ultraviolet light, visible light or infrared light, the high energy and high flux γ-ray, X-ray or electron beam used in the embodiments of the present disclosure has significant different wavelengths, number of photos, and energy. The high energy and high flux energy beam differs from the commonly used energy sources for the photochemical reactions in that it has sufficient intensity and therefore the reactant fluid can fully undergo the reaction instantaneously, such as within one second. The reactant fluid irradiated by the energy beam may undergo oxidation, reduction or radical reactions. Depending on the type of reaction to undergo, the reactant fluid may comprise one or more reactants. In some embodiments wherein the high energy and high flux electron beam is used, the electron beam has an energy range from 0.1 to 500 MeV and a dose rate greater than $1 \times 10^4$ Gy·s⁻¹.

The flow-type synthesis method provided by the embodiments of the present disclosure may be used to proceed to various synthesis reactions. Parameters of the synthesis reactions may be optimized by adjusting the volumetric flow rate and/or the flow velocity of the reactant fluid, the intensity of the energy beam, the irradiation time of the energy beam or the synthesis temperature. For example, specific physical and chemical properties, such as the shape, size, electric property, magnetic property, optical property, molecular weight, or combinations thereof, of the product fluid synthesized may be adjusted by controlling the volumetric flow rate of the reactant fluid. In some embodiments, the reactant fluid may comprise a precursor solution of nanoparticles, a polymer solution, a polymerization monomer solution, or combinations thereof. In these embodiments, the nanoparticles may comprise Au nanoparticles, Ag nanoparticles, Cu nanoparticles, Pt nanoparticles, Pd nanoparticles, $Fe_2O_3$ nanoparticles, quantum dots, polymer nanoparticles, or combinations thereof. Moreover, the shape, size, electric property, magnetic property, optical property, molecular weight, or combinations thereof of the nanoparticles may be adjusted by controlling parameters, such as the flow velocity and/or the volumetric flow rate, of the reactant fluid. In one embodiment, the reactant/precursor fluid has a volumetric flow rate in a range of 1 to 2000 mL·hr⁻¹.

The flow-type synthesis method according to the present disclosure may be implemented using various devices or apparatuses.

In some embodiments, a dropper, a nozzle, a sprayer or combinations thereof may be used to provide the flowing reactant fluid, and the reactant fluid is irradiated by the energy beam to undergo a synthesis reaction. Therefore, in these embodiments, the reactant fluid may also be hung or suspended in the air to undergo the synthesis reaction, and the reactive atmosphere may be vacuum, an atmospheric environment or other gases. For example, a dropper may be used to provide a flowing reactant fluid, and the reactant fluid dropped from the dropper is irradiated by the energy beam to undergo the synthesis reaction. Alternatively, a nozzle may be used to spry a precursor/reactant fluid, and the precursor/reactant fluid sprayed form the nozzle is irradiated by the energy beam to undergo the synthesis reaction. However, in these embodiments, a preparation tank for the reactant fluid, a pipe, a valve, a volume flow controller, a timer, a temperature monitoring device, a cooling device, a sample collector or combinations thereof may also be used. The valve may be manually or automatically controlled, and has a switch function for controlling the passing or non-passing of the reactant fluid. The volume flow controller may control the flow velocity and/or the volumetric flow rate. The temperature monitoring device may monitor the temperature of the reactant fluid or the ambient temperature during the synthesis reaction. The cooling device may cool the temperature when it becomes too high during the synthesis reaction, and it may be cooperated with the temperature monitoring device. The cooling device comprises a fan, a radiating fin, a heat sink, a heat dissipation sheet, a sprayer, a gaseous or liquid cooling system or combinations thereof.

In some embodiments, the flow-type synthesis method according to the present disclosure may be implemented in a device or apparatus, such as a pipe, a flow-type reactor or a sprayer, but it is not limited thereto. In these embodiments, a preparation tank for the reactant fluid, a pipe, a valve, a volume flow controller, a timer, a temperature monitoring device, a cooling device, a sample collector or combinations thereof may be further comprised. Various embodiments of flow-type reactors and synthesis methods using the same according to the present disclosure will be described below.

Figure 3:
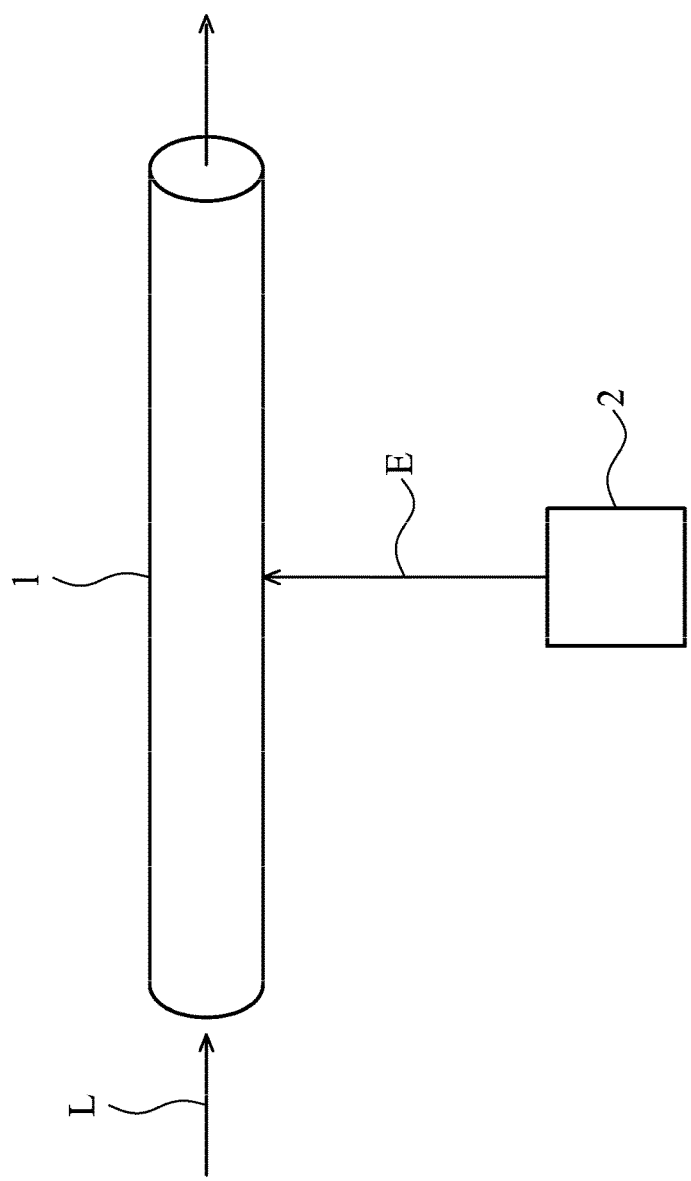
FIG. 3 illustrates an exemplary embodiment of a flow-type reactor according to the invention.

FIG. 3 illustrates an exemplary embodiment of a flow-type reactor 1000 according to the invention. In the embodiment, the flow-type reactor 1000 comprises a pipe 1 and an energy beam source device 2. The energy beam source device 2 may provide an energy beam E. As described previously, the energy beam comprises the high energy and high flux γ-ray, X-ray or electron beam, and the related descriptions are not repeated here. When a synthesis reaction is proceeded using the flow-type reactor 1000, the reactant fluid L passes through the pipe 1, and the energy beam E from the energy beam source device 2 irradiates the pipe 1 where the reactant fluid L passes through to undergo the reaction. For the energy beam E to successfully transmit through the irradiated portion of the pipe 1 thereby reaching the reactant fluid therein, the irradiated portion of the pipe 1 needs to have an energy beam transmissible material that is highly transmissible (or barely absorbable) for the energy beam E. In some embodiments, the energy beam transmissible material may comprise polymide, poly methyl methacrylate (PMMA) or combinations thereof. In other embodiments, the energy beam transmissible material may comprise a material containing H, Be, C, N, O, Al or combinations thereof. The material of the pipe may consist of a single material, a multi-layer material or a composite material. In some embodiments, the pipe may consist of the energy beam transmissible material entirely. In other embodiments, only the irradiated portion of the pipe consists of the energy beam transmissible material, while the remaining portion thereof may comprise an energy beam resistant material. The energy beam resistant material may comprise BaO, Al, Au, Ag, Cu, Fe, Pt or combinations thereof.

Figure 4:
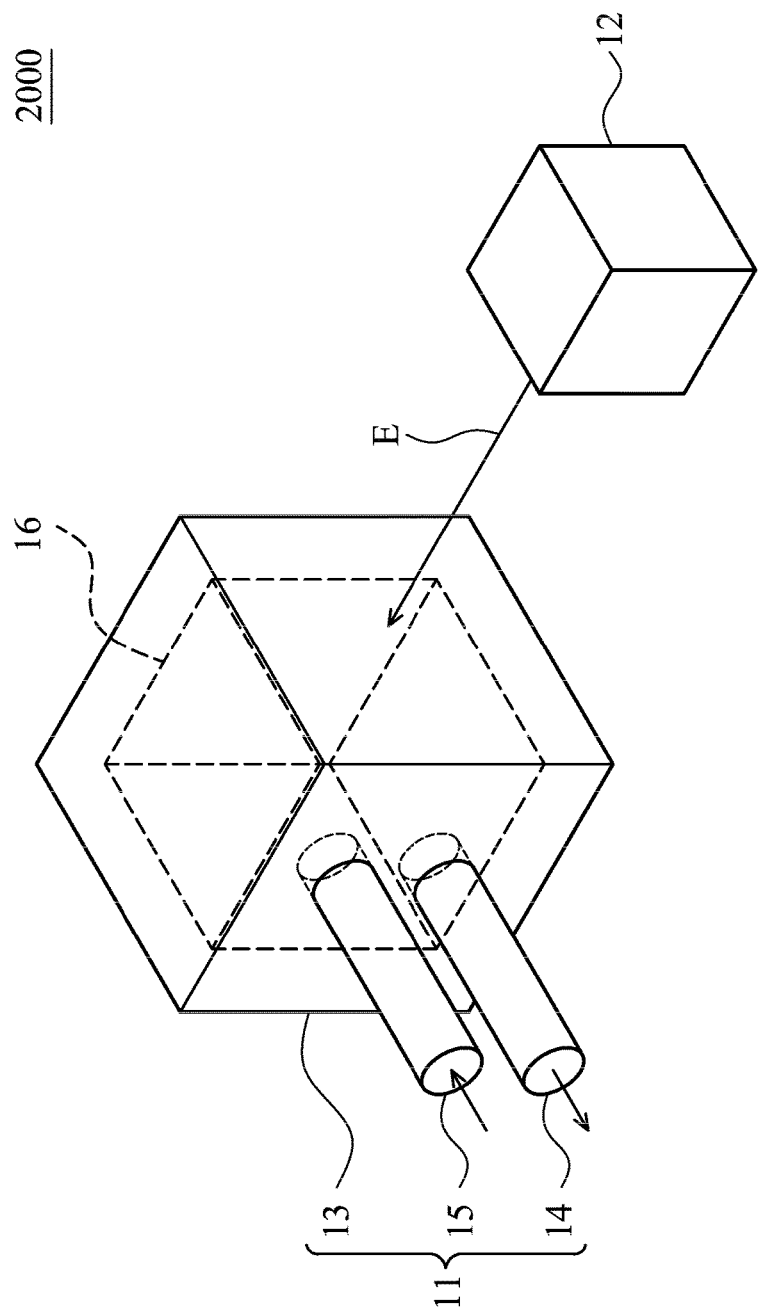
FIG. 4 illustrates another exemplary embodiment of a flow-type reactor according to the invention.

FIG. 4 illustrates another exemplary embodiment of a flow-type reactor 2000 according to the invention. The flow-type reactor 2000 may have any shape, and it may be operated in the orientation shown in FIG. 5 or in any other orientation. The flow-type reactor 2000 comprises a reactor body 11 and an energy beam source device 12. The reactor body 11 comprises a reaction chamber 13 to house a fluid, an inlet 14 in communication with the reaction chamber 13 to allow input of a reactant fluid, and an outlet 15 in communication with the reaction chamber 13 to allow output of a product fluid. The term "fluid" used herein may refer to the reactant fluid input into the reaction chamber 13 from the inlet 14, the intermediate product fluid formed during the reaction, and the product fluid formed after the reaction is complete. Moreover, the reaction chamber may house the fluid with a reactant loading space 16 that is in communication with the inlet 14 and the outlet 15. Although the reactant loading space 16 shown in FIG. 4 is a cube, it may have any other shape. A tube, for example, may be connected to the inlet 14 and/or outlet 15 to facilitate the input of the reactant fluid. The shapes of the reaction chamber 13, the inlet 14 and the outlet 15 are not particularly limited and may be any other shape according to demand. For example, the reaction chamber 13 may be columnar (or tubular), cuboid, cubic, polyhedral or irregularly shaped. The inlet 14 and the outlet 15 may be round, rectangular, square, polygonal (such as pentagonal, hexagonal or octagonal) or irregularly shaped. The inlet 14 and the outlet 15 may be disposed at any position to communicate with the reaction chamber 13 according to practical demands. The number of the inlet 14 may be one or more depending on the number of the reactants required for the reaction, and one or more reactants may be input through each inlet 14. Additionally, each inlet 14 may optionally comprise a valve (not shown), wherein the opening/closing of the valve may be manually or automatically controlled. Moreover, the flow-type reactor 2000 may further comprise one or more volume flow control system to control the input speed of the reactant fluid and/or the output speed of the product fluid. Therefore, the reactant fluid may be input into the reaction chamber by one or more inlets at the same speed or different speeds to achieve optimization of reaction parameters.

Moreover, the reaction chamber 13 may comprise an energy beam transmissible material. The reaction chamber 13 may be covered by the energy beam transmissible material, or the reaction chamber 13 may consist of the energy beam transmissible material partially or entirely. The energy beam transmissible material may be a film. The energy beam transmissible material is highly transmissible by (or barely absorbable of) the energy beam E. In some embodiments, the energy beam transmissible material may comprise polymide, poly methyl methacrylate (PMMA) or combinations thereof. In other embodiments, the energy beam transmissible material may comprises a material containing H, Be, C, N, O, Al or combinations thereof. If the reaction chamber 13 consists of more than one material and one of them is the described energy beam transmissible material, the rest of them may be an energy beam resistant material. The energy beam resistant material may comprise BaO, Al, Au, Ag, Cu, Fe, Pt or combinations thereof.

When the flow-type reactor 2000 is operated, a reactant fluid passes through the reactor body 11 to undergo a reaction. The reactant fluid is first input into the reaction chamber 13 through the inlet 14, and the energy beam provided by the energy beam source device 12 irradiates the reactant fluid passing through the reaction chamber 13 to proceed to a synthesis reaction to form a product fluid, and the product fluid is output through the outlet 15. In other embodiments, the product fluid may be output through more than one outlet.

The energy beam source device 12 provides an energy beam E to irradiate the reaction chamber, such that the fluid housed by the reaction chamber undergoes a reaction. The energy beam E may comprise a high energy and high flux γ-ray, X-ray or electron beam. The descriptions have been stated previously and will not be repeated here.

According to the embodiments, the problem of the prior art that the reactions can only occurs as batch reactions, can be overcome by combining the high-energy beam with the flow-type reactions. Since the provided energy beam has sufficient energy intensity, the reactant fluid can undergo a reaction instantaneously, such as within one second. Compared with the batch reactions, the flow-type reactions do not require the step of taking out the product after each reaction. Therefore, the flow-type reactions provide economic benefits and higher productivity, and are suitable for mass production.

Embodiment 1

Figure 5:
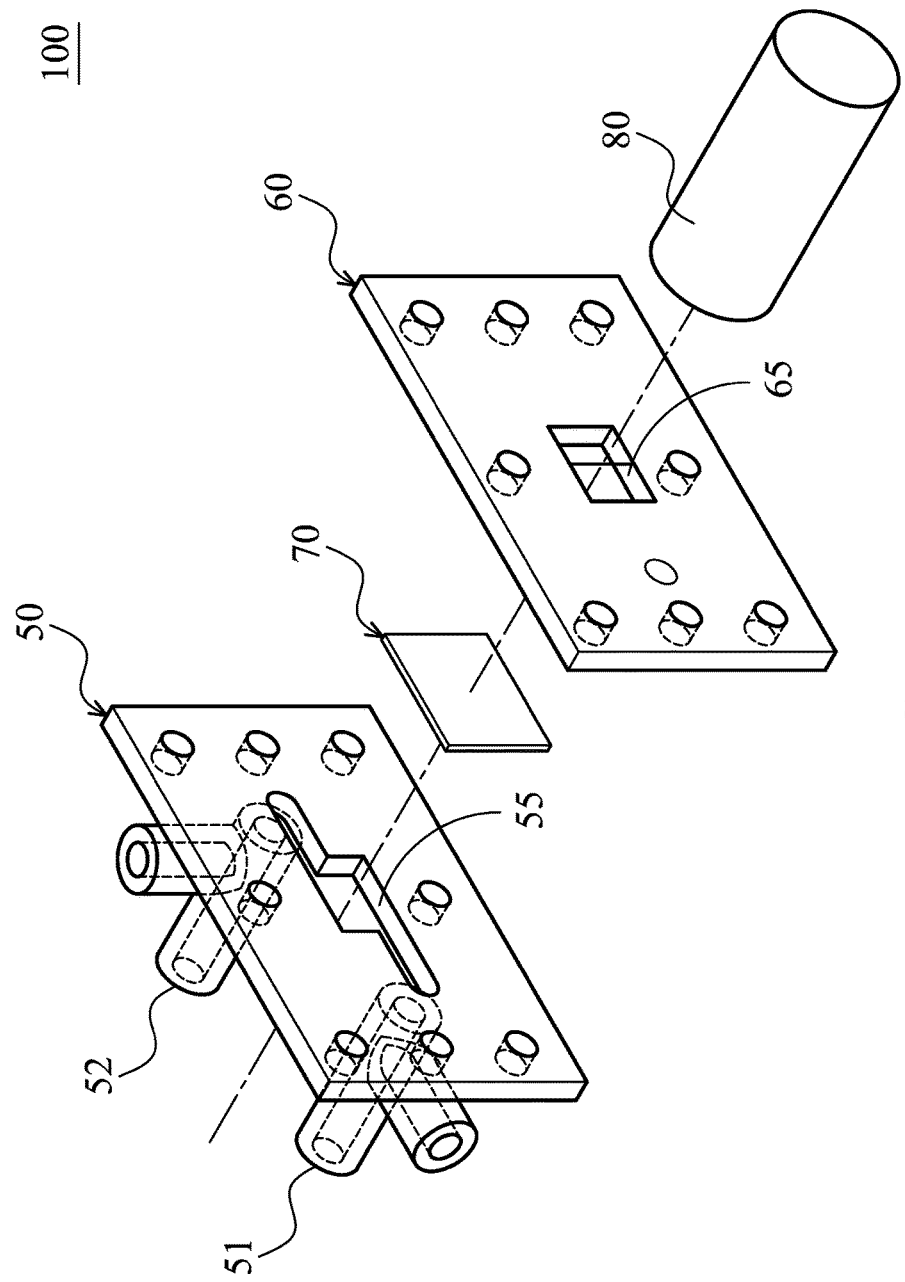
FIG. 5 illustrates a flow-type reactor according to Embodiment 1.

FIG. 5 illustrates a flow-type reactor 100 according to Embodiment 1. The flow-type reactor 100 substantially comprises four components, which are an aluminum reactor body 50, an aluminum cover 60, a polymide film 70 (i.e., an energy beam transmissible material) disposed between the aluminum reactor body 50 and the aluminum cover 60, and a synchrotron X-ray source 80. The aluminum reactor body 50 (first component) comprises an inlet 51, an outlet 52 and a cavity 55 (serving as a reactant loading space) in communication with the inlet 51 and the outlet 52. The aluminum cover 60 (second component) has a window 65 corresponding to the cavity 55, and the polymide film 70 is sandwiched between the cavity 55 and the window 65. The size of the polymide film 70 is not smaller than that of the window 65 to fully cover and seal the window 65.

The synchrotron X-ray source 80 is located about 20 cm away from the aluminum cover 60 having the window 65. The synchrotron X-ray has a dose rate about $2\times10^4$ Gy·s$^{-1}$, and the irradiation area is about 12 mm×8 mm.

During the synthesis reaction, the reactant fluid is input into the cavity 50 through the inlet 51. A synchrotron X-ray provided by the synchrotron X-ray source 80 irradiates the reactant fluid in the cavity 55 through the polymide film 70 to proceed to the synthesis reaction, thereby forming a product fluid. The product fluid is output through the outlet 52.

In the Embodiment 1, when an area irradiated by the synchrotron X-ray source 80 is smaller than a cross-sectional area of a reacting unit of the reactant fluid, unirradiated portions of the reactant fluid may undergo a reaction by convection, such as the heat convection or the reactant diffusion, which results in difference in the reaction time. Thus, the uniformity of the reaction is poor, and the reactant fluid does not even fully undergo the reaction. Therefore, the window 65 of the flow-type reactor 100 is designed to have an area smaller than a cross-sectional area of the synchrotron X-ray source 80, such that occurrence of the convection merely concerns the thickness of the reacting unit and the volumetric flow rate of the fluid.

Figure 6:
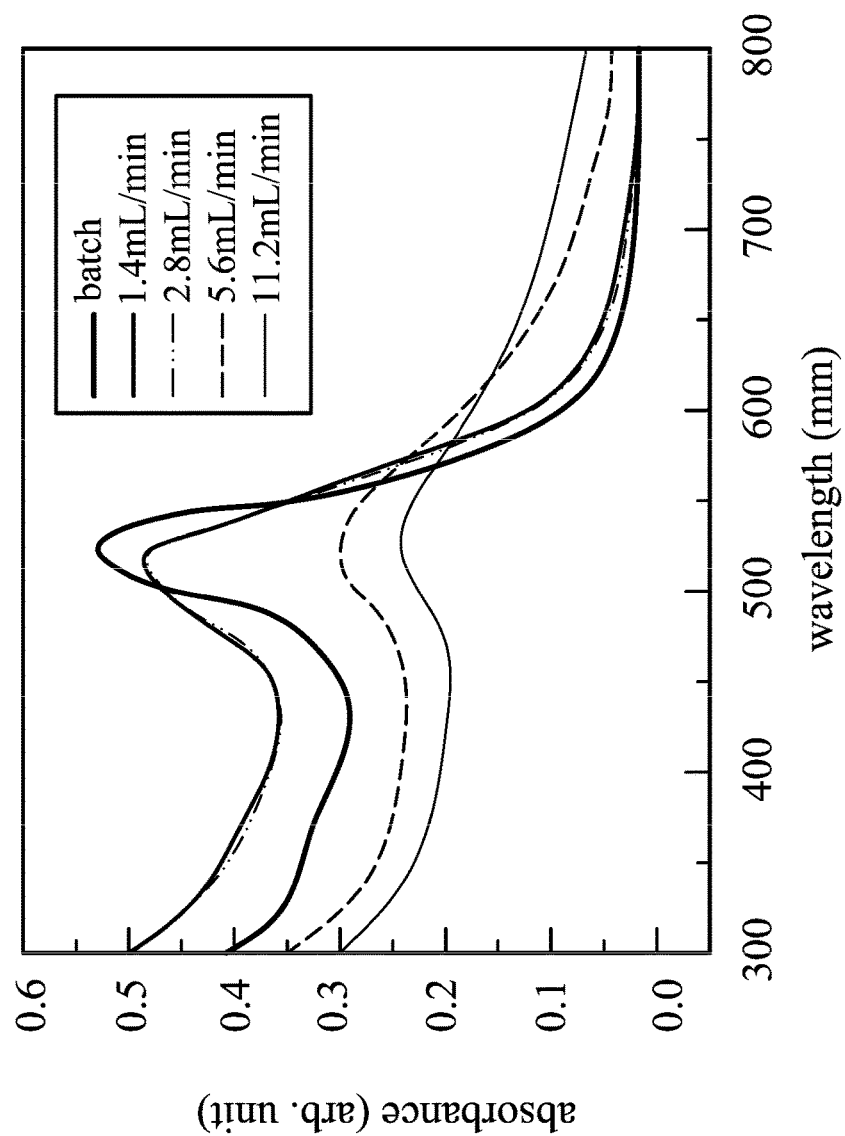
FIG. 6 illustrates an absorption spectrum diagram showing absorbance of different rare gold nanoparticle solutions measured by an ultraviolet-visible light spectrometer.

Moreover, referring to FIG. 6, it illustrates an absorption spectrum diagram showing absorbance of different rare gold nanoparticle solutions measured by an ultraviolet-visible light spectrometer. The different rare gold nanoparticle solutions are obtained and synthesized using the synchrotron X-ray source by the batch reactions and the flow-type reaction (the volumetric flow rates are 1.4, 2.8, 5.6 and 11.2 mL/min), respectively. FIG. 6 shows changes of absorption peak positions of specific surface plasmon resonance of the gold nanoparticle. For example, when the volumetric flow rate is increased from 1.4 mL/min to 11.2 mL/min, the absorption peak position is shifted from 514 nm to 529 nm. It implies that the size of the rare gold nanoparticle significantly becomes larger. Namely, the size of the nanoparticle can be adjusted by changing the volumetric flow rate in the flow-type reactor.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A convection-free flow synthesis method, comprising: providing a convection-free flow reactor comprising:
   a reactor body comprising:
      a reaction chamber to house a fluid;
      an inlet in communication with the reaction chamber to allow input of a reactant fluid, wherein the reactant fluid consists of a precursor solution of nanoparticles; and
      an outlet in communication with the reaction chamber to allow output of a product fluid; and
   an energy beam source device providing an energy beam to irradiate the reactant fluid in the reaction chamber;
inputting the reactant fluid into the reaction chamber through the inlet; and
irradiating the reactant fluid in the reaction chamber through an energy beam transmissible material by the energy beam to form the product fluid in a convection-free manner, wherein the product fluid is output through the outlet, and wherein the energy beam comprises X-ray.

2. The method as claimed in claim 1, wherein the energy beam irradiates continuously.

3. The method as claimed in claim 1, wherein the energy beam irradiates intermittently.

4. The method as claimed in claim 1, wherein the product fluid comprises the nanoparticles, and the nanoparticles comprise Au nanoparticles, Ag nanoparticles, Cu nanoparticles, Pt nanoparticles, Pd nanoparticles, $Fe_2O_3$ nanoparticles, quantum dots, polymer nanoparticles, or combinations thereof.

5. The method as claimed in claim 4, wherein a shape, size, electric property, magnetic property, optical property, molecular weight, or combinations thereof of the nanoparticles is adjusted by controlling a volumetric flow rate of the reactant fluid.

6. The method as claimed in claim 1, wherein a shape, size, electric property, magnetic property, optical property, molecular weight, or combinations thereof of the product fluid is adjusted by controlling a volumetric flow rate of the reactant fluid.

7. The method as claimed in claim 1, wherein the reactant fluid has a volumetric flow rate in a range of 1 to 2000 mL·hr$^{-1}$.

8. The method as claimed in claim 1, wherein the X ray has a dose rate greater than $10^{12}$ photons·(mm$^2$·s)$^{-1}$.

9. The method as claimed in claim 1, wherein the X ray has a dose rate greater than $3 \text{ mJ} \cdot (\text{cm}^2 \cdot \text{s})^{-1}$.

10. A convection-free flow synthesis method, comprising:
providing a convection-free flow reactor comprising:
- a reactor body comprising:
  - a reaction chamber to house a fluid;
  - an inlet in communication with the reaction chamber to allow input of a reactant fluid, wherein the reactant fluid consists of a precursor solution of nanoparticles;
  - an outlet in communication with the reaction chamber to allow output of a product fluid;
  - a first component having a reactant loading space; and
  - a second component having a window corresponding to the reactant loading space, wherein an energy beam transmissible material is disposed between the first and second components; and
- an energy beam source device providing an energy beam to irradiate the reactant fluid in the reaction chamber, wherein the window of the second component of the reactor body has an area smaller than a cross-sectional area of the energy beam;

inputting the reactant fluid into the reaction chamber through the inlet; and irradiating the reactant fluid in the reaction chamber through the energy beam transmissible material by the energy beam to form the product fluid in a convection-free manner, wherein the product fluid is output through the outlet, and wherein the energy beam comprises X-ray.

* * * * *